(12) United States Patent
Maruyama et al.

(10) Patent No.: US 8,799,530 B2
(45) Date of Patent: Aug. 5, 2014

(54) DATA PROCESSING SYSTEM WITH A HOST BUS ADAPTER (HBA) RUNNING ON A PCIE BUS THAT MANAGES THE NUMBER ENQUEUES OR DEQUEUES OF DATA IN ORDER TO REDUCE BOTTLENECK

(71) Applicant: Hitachi, LTD., Tokyo (JP)

(72) Inventors: Takafumi Maruyama, Hadano (JP); Megumu Hasegawa, Hadano, PA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/875,420

(22) Filed: May 2, 2013

(65) Prior Publication Data

US 2013/0304949 A1    Nov. 14, 2013

(30) Foreign Application Priority Data

May 10, 2012    (JP) .................................. 2012-108104

(51) Int. Cl.
*G06F 9/44*    (2006.01)
(52) U.S. Cl.
USPC ................... 710/28; 710/10; 710/33; 710/22

(58) Field of Classification Search
None
See application file for complete search history.

(56) References Cited

U.S. PATENT DOCUMENTS 5,918,028 A * 6/1999 Silverthorn et al. .......... 710/306
7,149,823 B2 * 12/2006 Miller et al. .................... 710/22
7,821,973 B2 * 10/2010 McGee et al. ................ 370/306
8,607,214 B2 * 12/2013 Toyohara et al. ............. 717/168

FOREIGN PATENT DOCUMENTS

JP    2008-102928 A    5/2008

* cited by examiner

*Primary Examiner* — Tammara Peyton
(74) *Attorney, Agent, or Firm* — Mattingly & Malur, PC

(57) ABSTRACT

An HBA driver manages a queue number for enqueuing and dequeuing data to an I/O queue by the main storage, and HBA-F/W manages a storage region at inside of HBA. The HBA driver reduces the number of access times by way of the PCIe bus by noticing an enqueued queue number or a dequeued queue number of an I/O queue to HBA-F/W by utilizing an MMIO area of the main storage in which a storage region on HBA is mapped.

15 Claims, 8 Drawing Sheets

DATA PROCESSING SYSTEM WITH A HOST BUS ADAPTER (HBA) RUNNING ON A PCIE BUS THAT MANAGES THE NUMBER ENQUEUES OR DEQUEUES OF DATA IN ORDER TO REDUCE BOTTLENECK

CLAIM OF PRIORITY

The present application claims priority from Japanese patent application JP 2012-108104 filed on May 10, 2012, the content of which is hereby incorporated by reference into this application.

TECHNICAL FIELD

The present invention relates to a computer including HBA which controls transmission/reception of data to and from an I/O device.

BACKGROUND

In recent years, an amount of data which is processed on a computer system has been increased more and more, and it is necessary to process enormous data at high speed. In accordance therewith, it is necessary to further increase a communication speed between a computer and an I/O device. It is also necessary to further accelerate a speed of a computer which controls transmission/reception of data to and from an I/O device.

A computer in an open system widely uses Host Bus Adapter (HBA) which uses a Peripheral Component Interconnect (PCI) bus which is decided at PCI-SIG for connecting to CPU or a main storage at inside of a computer. Also, HBA which uses a further accelerated Express (R) bus (PCIe bus) is widely used in place of a PCI bus.

SUMMARY

When HBA transmits/receives data to and from an I/O device, HBA needs to access a main storage on a computer by passing PCIe bus. However, an access by way of PCIe bus is at a very low speed in comparison with an access to a storage region in HBA of firmware (HBA-F/W) which is operated on HBA or an access of an HBA driver to a main storage. Therefore, when HBA connected to PCIe bus carries out a data transmission/reception processing, the access to PCIe becomes one of factors of deteriorating a performance.

First, an explanation will be given of an input/output control method in a computer of a related art with reference to FIG. 6, and an explanation will be given of a problem which is posed in a computer of FIG. 6 with reference to FIG. 7 and FIG. 8.

FIG. 6 shows an example of an input/output control method of a computer 1110 of a related art. An explanation will be given of a processing of delivering received data to an application 1101 in a case where HBA 1106 receives data transmitted from an I/O device 1113 with reference to FIG. 6.

An HBA driver 1102 which controls HBA 1106 is operated on OS (operating system) 1100. HBA-F/W 1107 which carries out a control of HBA 1106, a data transmission/reception control to and from the I/O device 1113, and an access control to a main storage 1103 is operated at HBA 1106. HBA 1106 is also mounted with a storage region 1108.

The HBA driver 1102 and the HBA-F/W 1107 transfer data which is received from the I/O device 1103 from HBA onto the main storage 1103 by using an I/O response queue 1114 which is present on the main storage 1103. The I/O response queue 1114 is allocated with a single entry for the received data, and the I/O response queue 1114 is configured by plural entries for enabling to receive plural data simultaneously. An enqueue position of the I/O response queue 1114 which is configured by the plural entries is designated by R_In_Queue#1121 and a dequeue position thereof is indicated by R_Out_Queue#1122.

The HBA driver 1102 and the HBA-F/W 1107 transfer data which is transmitted from the main storage 1103 from HBA to the I/O device 1113 by using an I/O activation queue 1115. The I/O activation queue 1115 is allocated with a single entry for transmitted data, and the I/O activation queue 1115 is configured by plural entries in order to enable to transmit plural data simultaneously. An enqueue position of the I/O activation queue 1115 which is configured by the plural entries is designated by S_In_Queue#1123 and a dequeue position thereof is designated by S_Out_Queue#1124.

Enqueuing and dequeuing are executed successively from a front entry. When enqueuing and dequeuing are finished up to a final entry, enqueuing and dequeuing are executed from the front entry.

Now, when HBA 1106 receives data which is transmitted from the I/O device 1113, HBA-F/W 1107 accesses the main storage 1103 through a PCIe bus 1105, reads the R_In_Queue#1121 and the R_Out_Queue#1122, and confirms an enqueue position of the I/O response queue 1114. Thereafter, HBA-F/W 1107 accesses the main storage 1103 through the PCIe bus 1105, enqueues data to the entry indicated by the confirmed I/O response queue 1114, further accesses the main storage device 1103 through the PCIe bus 1105, and updates the R_In_Queue#1121 to a value which indicates a next entry.

Thereafter, the HBA driver 1102 accesses the main storage 1103 when the HBA driver 1102 is noticed that data is enqueued from HBA-F/W 1107, reads the R_In_Queue#1121 and the R_Out_Queue#1122, and checks a location of storing data which is to be dequeued from the I/O response queue 1114. Further, the HBA driver 1102 carries out dequeuing from the checked storing location, and updates the R_Out_Queue#1122 to a value which indicates a next entry.

The HBA driver 1102 delivers the delivered data to the application 1101 to thereby finish a processing of data which is received from the I/O device 1113.

When the HBA driver 1102 receives a request for transmitting data from the OS 1100, the HBA driver 1102 accesses the main storage 1103, reads the S_In_Queue#1123 and the S_Out_Queue#1124, and confirms an enqueuing position of the I/O activation queue 1115. Thereafter, the HBA driver 1102 accesses the main storage 1103, enqueues data to the entry which is indicated by the confirmed I/O activation queue 1115, further accesses the main storage 1103, and updates the S_In_Queue#1123 to a value which indicates a next entry.

Thereafter, when the HBA-F/W 1107 is noticed that data is enqueued from the HBA driver 1102, the HBA driver 1102 accesses the main storage 1103 through the PCIe bus 1105, reads the S_In_Queue#1123 and the S_Out_Queue#1124, and checks a location of storing data to be dequeued from the I/O activation queue 1115. Further, the HBA-W/W 1107 carries out dequeuing from the checked storing location through the PCIe bus 1105, and updates the S_Out_Queue#1124 to a value which indicates a next entry.

The HBA-F/W 1107 transmits the dequeued data to the I/O device 1113 to thereby finish a processing of transmitting data which is requested from the OS 1110.

FIG. 7 shows an operation flow with regard to control of the I/O response queue when data is received from the I/O device 1113 in the computer 1110 of the related art. An explanation will be given of a problem which is posed when the control of the I/O response queue in the computer 1110 of the related art is carried out with reference to FIG. 7 with a case where the HBA 1106 receives data from the I/O device 1113 as an example.

First, when the HBA-F/W 1107 recognizes that data is received from the I/O device 1113 (500), the HBA-F/W 1107 reads the R_In_Queue#1121 and the R_Out_Queue#1122 from the main storage 1103 (501). In the processing of 501, the HBA-F/W 1107 needs to access the main storage 1103 through the PCIe bus 1105.

Next, the HBA-F/W 1107 checks an enqueue acceptability of the I/O response queue 1114 from the R_Out_Queue#1122 and the R_In_Queue#1121, and holds enqueuing until enqueuing is acceptable in a case where the enqueuing is not acceptable (502).

When enqueuing is determined to be acceptable at 502, the HBA-F/W 1107 writes received data to an entry of the main storage 1103 which is indicated by the R_In_Queue#1121 (503), updates the R_In_Queue#1121 to a value which indicates a next entry, and writes an updated value of the R_Out_Queue#1121 to the main storage 1103 (504). Similar to the processing of 501, the HBA-F/W 1107 needs to access the main storage 1103 through the PCIe bus 1105 also at the processings of 503 and 504.

Next, the HBA-F/W 1107 carries out an interruption processing in order to notice that the I/O response queue 1114 is enqueued to the HBA driver 1102 (505).

The HBA driver 1102 which receives the interruption reads the R_In_Queue#1121 and the R_Out_Queue#1122 which are updated by the HBA-F/W 1107 from the main storage 1103 (506), and reads data from the entry of the I/O response queue 1114 which is indicated by the R_Out_Queue#1122 (507).

Next, the HBA driver 1102 updates the R_Out_Queue#1122 to a value which indicates a next entry, and writes the updated value of the R_Out_Queue#1122 to the main storage 1103 (508).

The HBA driver 1102 repeats processings of 507 and 508 until the updated value of the R_Out_Queue#1122 is equal to a value of the R_In_Queue#1121 (509).

In this way, according to the computer 1110 of the related art, the HBA-F/W 1107 needs to access the main storage 1103 repeatedly via the PCIe bus 1105 for reading and writing the R_In_Queue#1121 and the R_Out_Queue#1122 other than enqueuing data to the I/O response queue 1114 at each time of carrying out a processing of receiving data.

FIG. 8 shows an operation flow with regard to a control of an I/O activation queue when data is transmitted from the HBA 1106 in the computer 1110 of the related art. An explanation will be given of a problem which is posed when the I/O activation queue is controlled in the computer 1110 of the related art with a case of transmitting data from the HBA 1106 to the I/O device 1113 as an example with reference to FIG. 8.

First, when the HBA driver 1102 recognizes that a request for transmitting data is received from the OS 1100 (510), the HBA driver 1102 reads the S_In_Queue#1123 and the S_Out_Queue#1124 from the main storage 1103 (511).

Next, the HBA driver 1102 checks an enqueue acceptability of the I/O activation queue 1115 from the S_Out_Queue#1124 and the S_In_Queue#1123, and holds enqueuing until enqueuing is acceptable in a case where it is determined that enqueuing is unacceptable (512).

When it is determined that enqueuing is acceptable at 512, the HBA driver 1102 writes data to be transmitted to an entry of the main storage 1103 which is indicated by the S_In_Queue#1123 (513), updates the S_In_Queue#1123 to a value which indicates a next entry, and writes an updated value of the S_In_Queue#1123 to the main storage 1103 (514).

Next, the HBA driver 1102 carries out a processing of noticing that the I/O activation queue 1115 is enqueued to the HBA-F/W 1107 (515).

The noticed HBA-F/W 1107 reads the S_In_Queue#1123 and the S_Out_Queue#11124 which are updated by the HBA driver 1102 from the main storage 1103 (516), and reads data from an entry of the I/O activation queue 1115 which is indicated by the S_Out_Queue#1124 (517). In processings of 516 and 517, the HBA-F/W 1107 needs to access the main storage 1103 through the PCIe bus 1105.

Next, the HBA-F/W 1107 updates the S_Out_Queue#1124 to a value which indicates a next entry, and writes the updated value of the S_Out_Queue#1124 to the main storage 1103 (518). Similar to processings of 516 and 517, the HBA-F/W 1107 needs to access the main storage 1103 through the PCIe bus 1105.

The HBA-F/W 1107 repeats processings of 517 and 518 until the updated value of the S_Out_Queue#1124 is equal to the value of the S_In_Queue#1123 (519). Finally, the HBA-F/W 1107 transmits data which is read from the main storage 1103 to the I/O device 1113.

In this way, according to the computer 1110 of the related art, the HBA-F/W 1107 needs to access the main storage 1103 repeatedly via the PCIe bus 1105 for reading and writing the S_In_Queue#1123 and the S_Out_Queue#1124 other than enqueuing data to the I/O activation queue 1115 at each time of carrying out a processing of transmitting data.

According to the accessing processing by way of the PCIe bus 1105 described above, a number of routes by way of the PCIe bus 1105 or the like is large, and therefore, a processing time period is longer than that of a processing which is carried out at inside of the HBA 1106 and finished at inside of the HBA 1106, or a processing in which the HBA driver 1102 accesses the main storage 1103 only by way of a hot bridge 1112. Therefore, it is a bottleneck of performance of the computer 1110 of the related art that the processing repeatedly occurs, which poses a problem.

Japanese Unexamined Patent Application Publication No. 2008-102928 describes "there are provided an apparatus and a method for communicating with an input/output apparatus or an end point by using a queue data structure and an address which has been converted beforehand that relates to the queue data structure" (refer to abstract). That is, according to the present system, an execution speed of DMA can be increased by making an address conversion which is needed when a device connected to a PCI bus carries out a Direct Memory Access (DMA) through a PCI bus efficient. However, the access per se by way of the PCI bus is not reduced, which still poses a problem that a processing of accessing by way of the PCI bus becomes a bottleneck of processing performance of a device which is connected to the PCI bus.

In order to address the above-described problem, in a computer and an input/output method thereof according to the present invention, there is provided an input/output control method of a computer including CPU, a main storage connected to the CPU via a bridge, and a host bus adapter (HBA) connected to the CPU and the main storage via a PCIe bus connected to the bridge for transmitting and receiving data to and from an I/O device, in which the HBA includes an HBA firmware and a storage region, the CPU executes an OS and an HBA driver operated on the OS for controlling the HBA, the main storage includes an I/O queue from which the data is enqueued or dequeued, a management queue of managing a queue number of the data which is enqueued or dequeued from the I/O queue, and an Memory Mapped I/O (MMIO) area in which a storage region of the HBA is mapped. The HBA driver writes a piece of management information of an updated management queue to the MMIO area when the management queue is updated, and the OS writes the piece of management information written to the MMIO area to a storage region of the HBA in correspondence with the MMIO area of the main storage.

According to the present invention, a processing performance of transmission/reception of data which is carried out at HBA can be improved since a number of times of accesses by way of the PCIe bus is reduced in comparison with that of the related art because the MMIO area is utilized when transmission/reception processings of data are carried out among HBA, CPU, and the main storage.

DETAILED DESCRIPTION

An explanation will be given of a computer system to which the present invention is applied with reference to the drawings as follows. According to the present embodiment, an explanation will be given of an example of a computer which reduces a number of times of accesses by way of a PCIe bus when transmission/reception processings of data are carried out by using HBA.

Figure 2:
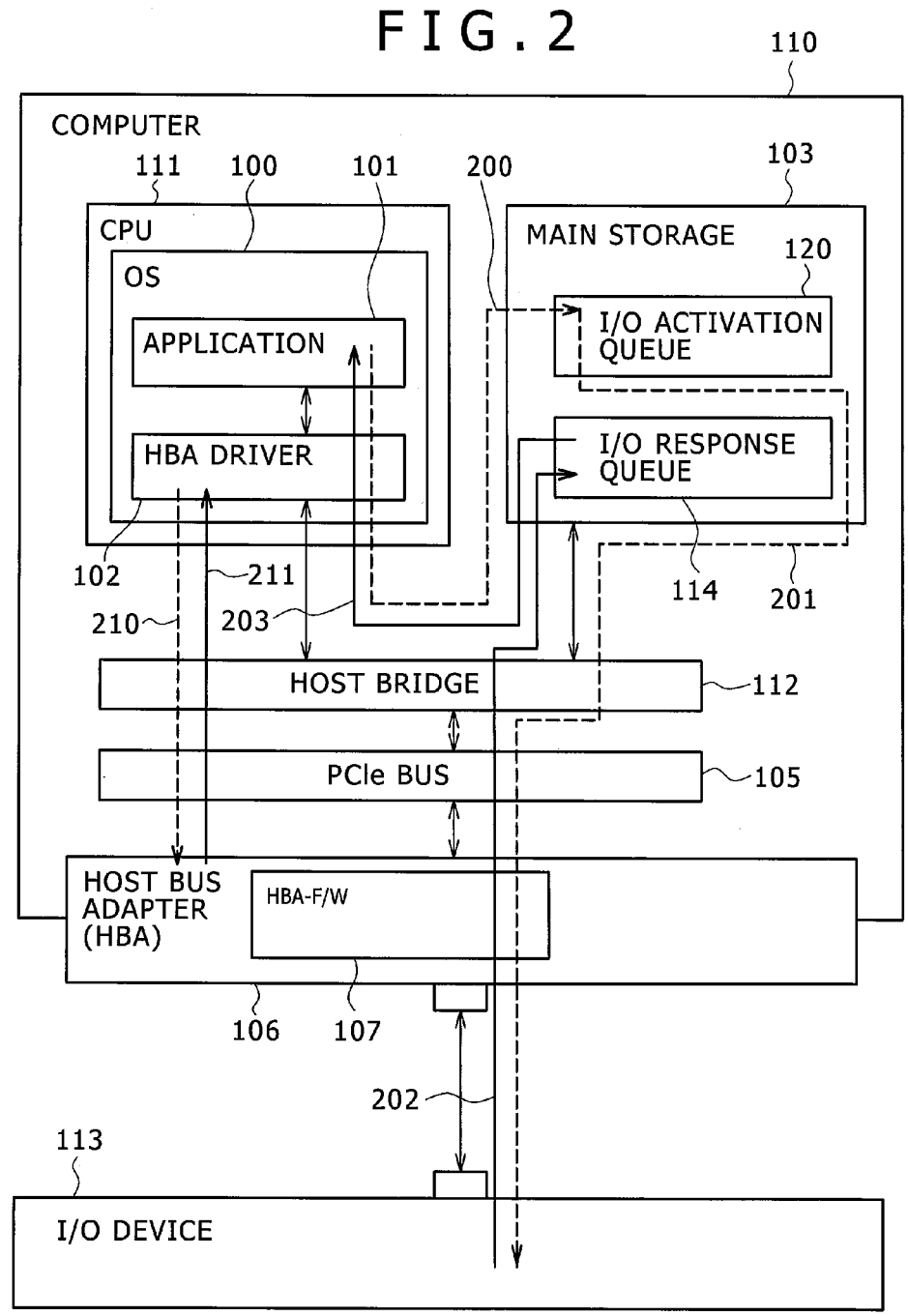
FIG. 2 is a configuration diagram of a computer system showing a flow of transmitting and receiving data between an I/O device and a computer according to the present embodiment.

FIG. 2 shows a computer system which connects HBA 106 to a PCIe bus. CPU 111 and a main storage 103 in a computer 110 are connected to HBA 106 through a PCIe bus 105 by a host bridge 112. The computer 110 is connected to an I/O device 113 via HBA 106. HBA 106 transmits and receives data to and from the I/O device 113 in accordance with a connection protocol which is used between HBA 106 and the I/O device 113.

In HBA 106, firmware (HBA-F/W 107) which carries out a control of HBA 106, a data transmission/reception control to and from the I/O device 113, and an access control to the main storage 103 is operated.

In the computer 110, an operating system (OS) 100 is operated, and an HBA driver 102 which controls an application 101 which writes data to the I/O device 113 and which reads data from the I/O device 113, and a control of HBA 106 is operated on OS 100.

An I/O activation queue 120 and an I/O response queue 114 as I/O queues are present on the main storage 103. The I/O activation queue 120 stores data for transmitting from HBA 106. The I/O response queue 114 stores data which HBA 106 receives.

Here, an explanation will be given of an operation of receiving data which is transmitted from the I/O device 113 by the computer 110.

First, when HBA 106 receives data, HBA-F/W 107 enqueues received data to the I/O response queue 114 through the PCIe bus 105 (202). Thereafter, HBA-F/W 107 notices that the I/O response queue 114 is enqueued to the HBA driver 102 (211).

The HBA driver 102 dequeues data from the I/O response queue 114, and delivers the data to the application 101 with the notice as a trigger (203). In a case of carrying out transmission/reception of data, the above-described processings are executed by a computer.

Next, an explanation will be given of an operation of transmitting data from the computer 110 to the I/O device 113.

The application 101 instructs to write generated data to the I/O device 113. Then, OS 100 instructs the HBA driver 102 to write the data to the I/O device 113.

The HBA driver 102 stores (enqueues) data to the I/O activation queue 120 in order to instruct HBA 106 to transfer data to the I/O device 113 (200). Thereafter, the HBA driver 102 notices that the I/O activation queue 120 is enqueued to HBA-F/W 107 (210).

HBA-F/W 107 takes out (dequeues) data from the I/O activation queue 120 through the PCIe bus 105, and transmits dequeued data to the I/O device 113 with the notice as a trigger (201). Data transmitted from HBA 106 is transmitted to the I/O device 113 by adding a piece of information which is necessary for transmission/reception in accordance with a connection protocol between HBA 106 and the I/O device 113.

Figure 1:
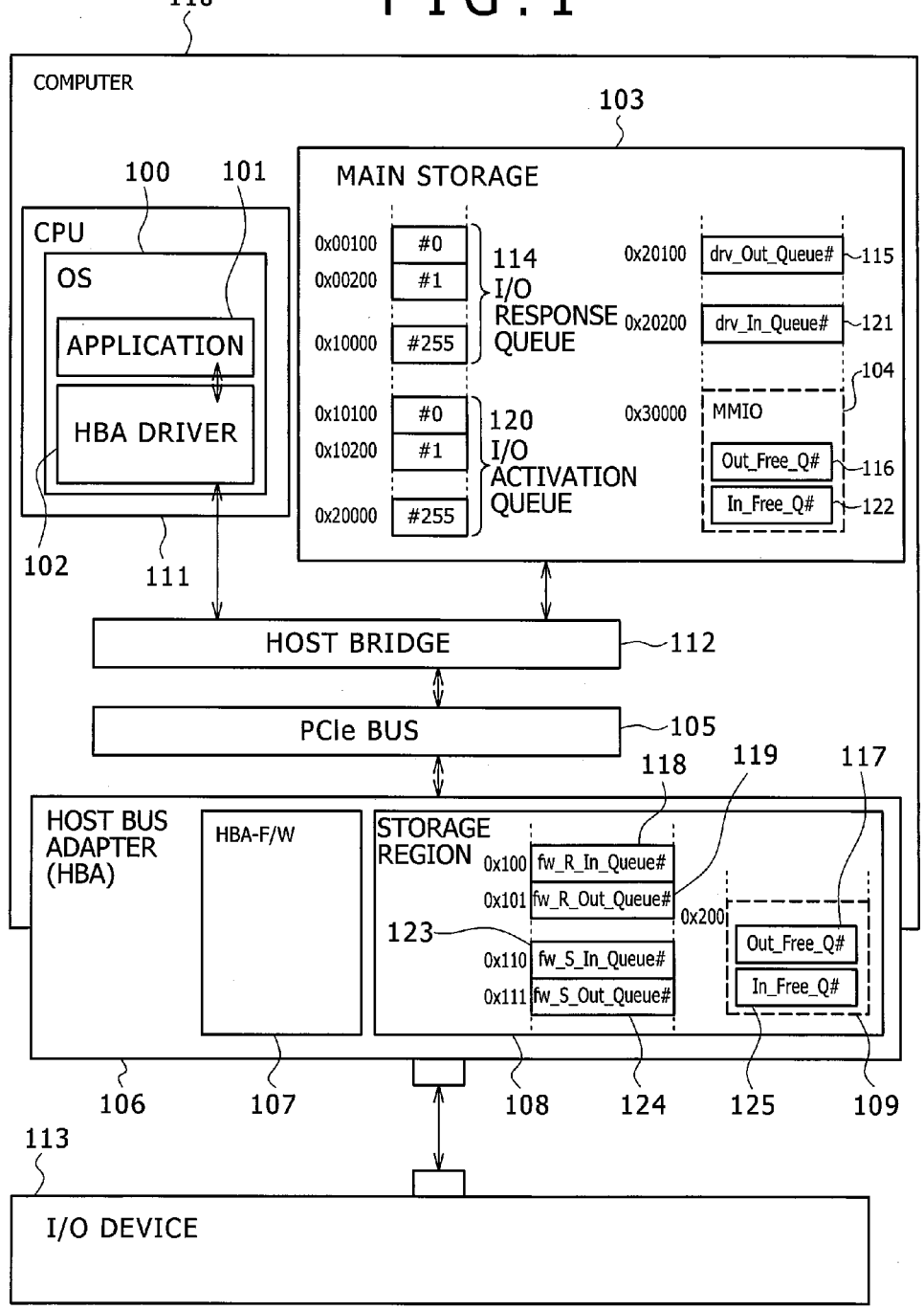
FIG. 1 is a configuration diagram of a computer system according to the present embodiment.

FIG. 1 shows details of FIG. 2, and shows a configuration and a control method of the computer 110 to which the present invention is applied.

HBA 106 includes a storage region 108 at inside of HBA and carries out a control of HBA 106, and transmission/reception of data to and from the I/O device 113. HBA-F/W 107 which carries out an access to the storage region 108, communication with the HBA driver 102 through the PCIe bus 105, and an access to the main storage 103 is operated for the control.

The main storage 103 is mapped with a piece of information which is a piece of information at inside of HBA 106 for controlling HBA 106 as memory mapped I/O (MMIO) 104, and a specific area 109 on the storage region 108 at inside of HBA is mapped on the main storage 103. A detailed explanation will be given of a method of using the main storage 103 and the storage region 108 at inside of HBA with reference to FIG. 3.

Figure 3:
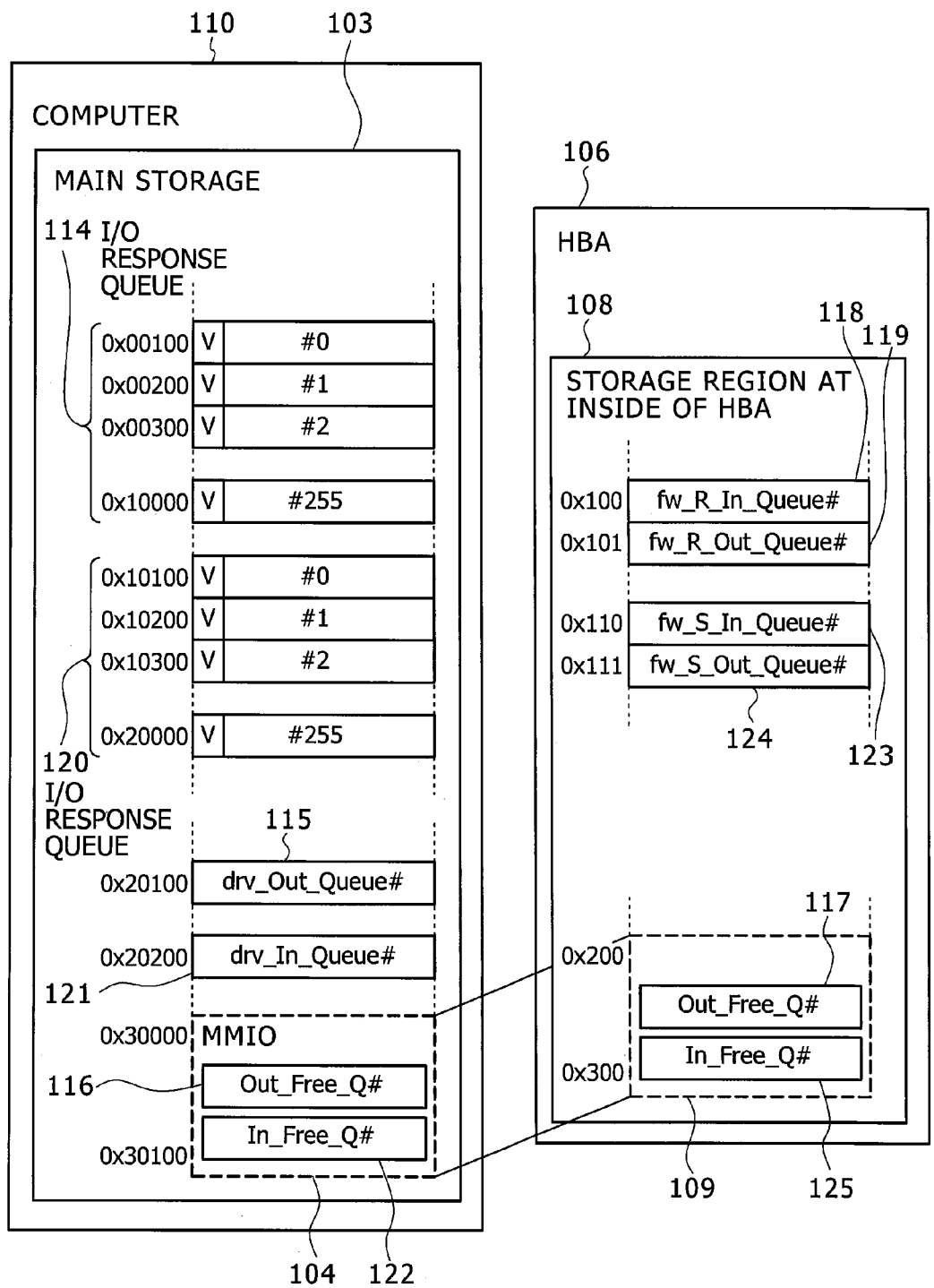
FIG. 3 is a diagram showing a correspondence between a main storage on a computer and a storage region on HBA according to the present embodiment.

FIG. 3 shows a correspondence between the main storage 103 on the computer 110 and the storage region 108 at inside of HBA 106.

The main storage 103 holds the I/O response queue 114, the I/O activation queue 120, drv_Out_Queue#115 which the HBA driver 102 uses for managing a queue number which is dequeued next from the I/O response queue 114, drv_In_Queue#121 which is used at the I/O activation queue 120 for managing a queue number which is enqueued next, and MMIO 104 which is an area at which the specific area 109 on the storage region 108 at inside of HBA is mapped. Incidentally, the queue number signifies a number of the entry on the main storage 103 which stores data.

The storage region 108 at inside of HBA holds fw_R_In_Queue#118 which HBA-F/W 107 uses for managing a queue number successively enqueued to the I/O response queue 114, Out_Free_Queue#117 which the HBA driver 102 notices a dequeue finishing number from the I/O response queue 114 to HBA-F/W 107, and fw_R_Out_Queue#119 which HBA-F/W 107 uses for managing a dequeue finishing number from the I/O response queue 114 which is noticed from the HBA driver 102 to HBA-F/W 107 by Out_Free_Q#117.

The storage region 108 at inside of HBA holds fw_S_Out_Queue#124 which HBA-F/W 107 uses for managing a queue number which dequeues next from the I/O activation queue 120, In_Free_Q#125 which the HBA driver 102 notices an enqueue finishing number to the I/O activation queue 120 to HBA-F/W 107, and fw_S_In_Queue#123 which HBA-F/W 107 uses for managing an enqueue finishing number to the I/O activation queue 120 which is noticed from the HBA driver 102 to HBA-F/W 107 by In_Free_Q#125.

Respective entries of the I/O response queue 114 and the I/O activation queue 120 are prepared with V bits indicating an effectiveness and an invalidity of a corresponding entry as Queue information. In a case where the V bit shows the effectiveness, the entry shows that data which is not dequeued yet is stored, and data cannot be enqueued newly. In a case where the V bit shows the invalidity, the case shows the entry has been dequeued, and data can be enqueued newly.

According to the HBA driver 102, HBA-F/W 107 can know to which entry of the I/O response queue 114 data has been enqueued by referring to the V bit when data is dequeued from the I/O response queue 114. Similarly, HBA-F/W 107 can know to which entry of the I/O activation queue 120 data has been dequeued by referring to the V bit when data is enqueued to the I/O activation queue 120.

For example, assuming that the I/O response queue 114, or the I/O activation queue 120 has 256 pieces of entries which store data, the drv_Out_Queue#115, the fw_R_Queue#118, and the fw_R_Out_Queue#119 are stored with a number indicating any one of entries 0 through 255 which the I/O response queue 114 has, and the drv_In_Queue#121, the fw_S_In_Queue#123, and the fw_S_Out_Queue#124 are stored with any one of numbers indicating 0 through 255 entries which the I/O activation queue 120 has. The data is enqueued or dequeued to or from entries having large numbers in turn from an entry of a number 0. The entries are cycled successively to an entry of a number 255, and enqueuing or dequeuing is carried out again at the entry of number 0.

When the HBA driver 102 writes data to MMIO 104, the data which is written to MMIO 104 is written to the specific area 109 on the storage region 108 at inside of HBA by OS 100. That is, a piece of information which is written to a portion (MMIO 104) of the main storage 103 by the HBA driver 102 is copied to the specific area 109 of the storage region 108 at inside of HBA 106 by assistance of OS 100. That is, the HBA driver 102 can be operated as if data were written to the storage region 108 at inside of HBA 106 by writing data to MMIO 104 of the main storage 103.

Therefore, HBA-F/W 107 according to the present embodiment can acquire data by accessing the specific area 109 on the storage region 108 at inside of HBA which is mapped to MMIO 104 in a case where data on the main storage 103 which the HBA driver 102 writes is intended to read, and it is not necessary to carry out a processing of reading data by accessing the main storage 103 through the PCIe bus 105.

For example, in a case where the HBA driver 102 intends to transfer an updated value to HBA-F/W 107 when the HBA driver 102 updates the drv_Out_Queue#115 in an operation of receiving data transmitted from the I/O device 113 by the computer 110, the HBA driver 102 writes a value indicating an entry one entry before drv_Out_Queue#115 to Out_Free_Q#116 in MMIO 104 in correspondence with Out_Free_Queue#117 on the storage region 108 at inside of HBA.

The reason of writing the value indicating the entry one entry before drv_Out_Queue#115 to Out_Free_Q#116 in MMIO 104 in correspondence with Out_Free_Queue#117 on the storage region 108 at inside of HBA is as follows. drv_Out_Queue#115 is incremented by 1 at a time point of 310 described later, and therefore, a value indicated by drv_Out_Queue#115 at a time point of 312 described later is a number of entry which the HBA driver dequeues next. That is, a number of entry which the HBA driver dequeues finally is a value obtained by decrementing drv_Out_Queue#115 by 1 at a time point of 312 described later. Hence, the value indicating the entry one entry before is written to Out_Free_Q#116.

Then, a value written to the Out_Free_Q#116 is written to Out_Free_Q#117 in the specific area 109 on the storage region 108 at inside of HBA by OS 100. Therefore, the HBA driver 102 can acquire the updated value of drv_Out_queue#115 by reading the Out_Free_Q#117.

Here, drv_Out_Queue#115 is written to fw_R_Out_Queue#119 by way of Free_Q#117. Further, it is confirmed that the I/O response queue is not in a FULL state (a state where a vacant entry is not present) by comparing a value indicated by fw_R_Out_Queue#119 and a value indicated by Free_R_Out_Queue#118+1. HBA-F/W 107 can be enqueued to the I/O response queue for the first time by confirming that there is a vacancy.

fw_R_In_Queue#118 indicates a number of an entry of the I/O response queue 114 which HBA-F/W 107 finally enqueues. fw_R_Out_Queue#119 indicates a number of an entry which the HBA driver 102 finally dequeues.

"fw_R_In_Queue#+1=fw_R_Out_Queue#?" which is checked at 302 described later is that dequeuing of the HBA driver 102 is retarded, and it is checked whether HBA-F/W 107 has enqueued up to in front of the entry which the HBA driver 102 schedules to dequeue (whether the I/O response queue is brought into the FULL state).

Similarly, in a case where in an operation of transmitting data from the computer 110 to the I/O device 113, when the HBA driver 102 updates the drv_In_Queue#121, an updated value is intended to transfer to HBA-F/W 107, the HBA driver writes a value indicating an entry one entry before drv_In_Queue#121 to In_Free_Q#122 in MMIO 104 in correspondence with In_Free_Q#125 on the storage region 108 at inside of HBA.

Then, a value written to the In_Free_Q#122 is written to In_Free_Q#125 in the specific area 109 on the storage region 108 at inside of HBA by OS 100. Therefore, HBA-F/W 107 can acquire a value of drv_In_Queue#121 which the HBA driver 102 updates by reading the In_Free_Q#125.

fw_S_in_Queue#123 indicates an entry number of the I/O activation queue which the HBA driver 102 finally enqueues. fw_S_Out_Queue#124 indicates a number of an entry which HBA-F/W 107 finally dequeues from the I/O activation queue.

"Processings . . . are repeated until fw_S_Out_Queue#= fw_S_In_Queue#+1) at 332 described later is that it is checked whether data to be dequeued remains at the I/O activation queue 120 by referring to the values.

In this way, in the computer 110 to which the present invention is applied, both of the HBA driver 1102 and HBA-F/W 1107 do not unifiedly execute management of I/O queue on the main storage by accessing the main storage 1103 as in the related art, but the HBA driver 102 carries out management of the I/O queue on the main storage 103 by itself, and HBA-F/W 107 carries out management of the I/O queue at the storage region 108 which is present on HBA 106 by itself. Further, when information for carrying out the management of the I/O queue is exchanged between the HBA driver 102 and HBA-F/W 107, MMIO 104 is utilized. Processings that HBA-F/W 107 accesses the main storage 103 through the PCIe bus can be reduced in comparison with the system of the related art when a transmission control of data is carried out by using HBA 106 in the computer 110 to which the present invention is applied by the above-described configuration, and the performance of the computer 110 can be improved.

A detailed explanation will be given of data receiving time and data transmitting time as follows at the computer 110.
<Data Receiving Time>

Figure 4:
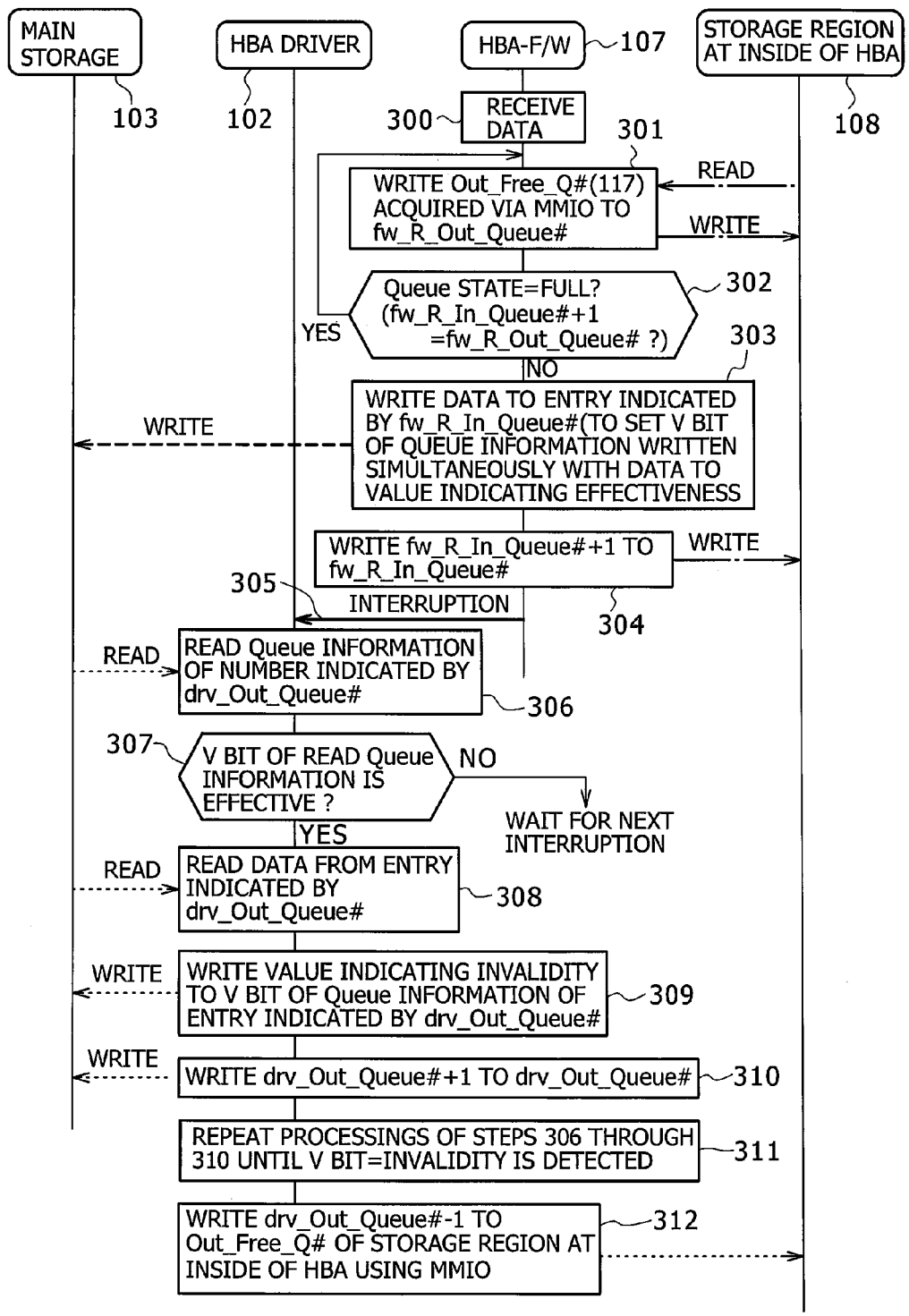
FIG. 4 is a control flow of an I/O response queue in the computer system according to the present embodiment.

FIG. 4 shows an operation flow when a control of the I/O response queue at the computer 110. An explanation will be given of a case where HBA receives data from the I/O device with reference to FIG. 4.

First, when HBA-F/W 107 recognizes that data is received (300), HBA-F/W 107 acquires a value of a queue number of an entry which the HBA driver 102 finally dequeues from the I/O response queue 114 by reading Out_Free_Queue#117 from the storage region 108 at inside of HBA, and writes the value to fw_R_Out_Queue#119 which is managed by HBA-F/W 107 (301).

Next, HBA-F/W 107 checks fw_R_Out_Queue#119 and fw_R_In_Queue#118, determines that enqueuing cannot be carried out in a case where fw_R_Out_Queue#119 indicates an entry next to fw_R_In_Queue#118, and holds enqueuing until enqueuing can be carried out (302).

When it is determined that enqueuing can be carried out at 302, HBA-F/W 107 writes received data to an entry of the response queue 114 which fw_R_In_Queue#118 indicates and changes a V bit of Queue information of the entry to a value which indicates an effectiveness (303).

Next, HBA-F/W 107 updates fw_R_InQueue#118 to a value which indicates a next entry, writes the updated value of fw_R_In_Queue#118 to the storage region 108 at inside of HBA (304), and carries out an interruption processing to the HBA driver 102 (305).

Incidentally, processings up to 300 through 304 correspond to 202 of FIG. 2. A processing of 305 corresponds to 211 of FIG. 2.

Incidentally, although an interruption 305 (211) is a processing by way of the PCIe bus by the HBA driver 102 and HBA-F/W 107, only a notice is carried out from HBA-F/W 107 to the HBA driver 102, which differs from an access to a so-called memory. Therefore, an amount of data which is processed by the interruption 305 is very small in comparison with an amount of data which is processed by the access to the memory. Therefore, although the interruption 305 is a processing by way of the PCIe bus, the interruption 305 does not have an influence on processing performance of transmission/reception of data. The HBA driver 102 which receives the interruption reads Queue information of entry of the main storage 103 which is indicated by drv_Out_Queue#115 (306), and checks a value of the read V bit (307).

When the V bit is a value indicating an invalidity, the HBA driver 102 proceeds to a standby state until next interruption is carried out. When the V bit is a value showing an effectiveness, the HBA driver 102 reads data from an entry of the main storage 103 which is indicated by drv_Out_Queue#115 (308).

When reading at 308 is finished, the HBA driver 102 writes a value indicating an invalidity to a V bit of Queue information of an entry of the main storage 103 which drv_Out_Queue#115 indicates (309) updates drv_Out_Queue#115 to a value which next entry indicates, and writes the updated value of drv_Out_Queue#115 to the main storage 103 (310).

The HBA driver 102 repeats processings of 306 through 310 until a value indicating an invalidity is detected by checking the V bit in the processing of 307 (311).

Next, the HBA driver 102 writes a value indicating an entry one entry before the entry indicated by drv_Out_Queue#115 to Out_Free_Queue#116 in MMIO 104 of the main storage 103. Thereby, a value of Out_Free_Queue#117 in the storage region 108 at inside of HBA is updated to a queue number which the HBA driver 102 finally dequeues from the I/O response queue 114 (312). Processings up to 306 through 312 correspond to 203 of FIG. 2.

Figure 7:
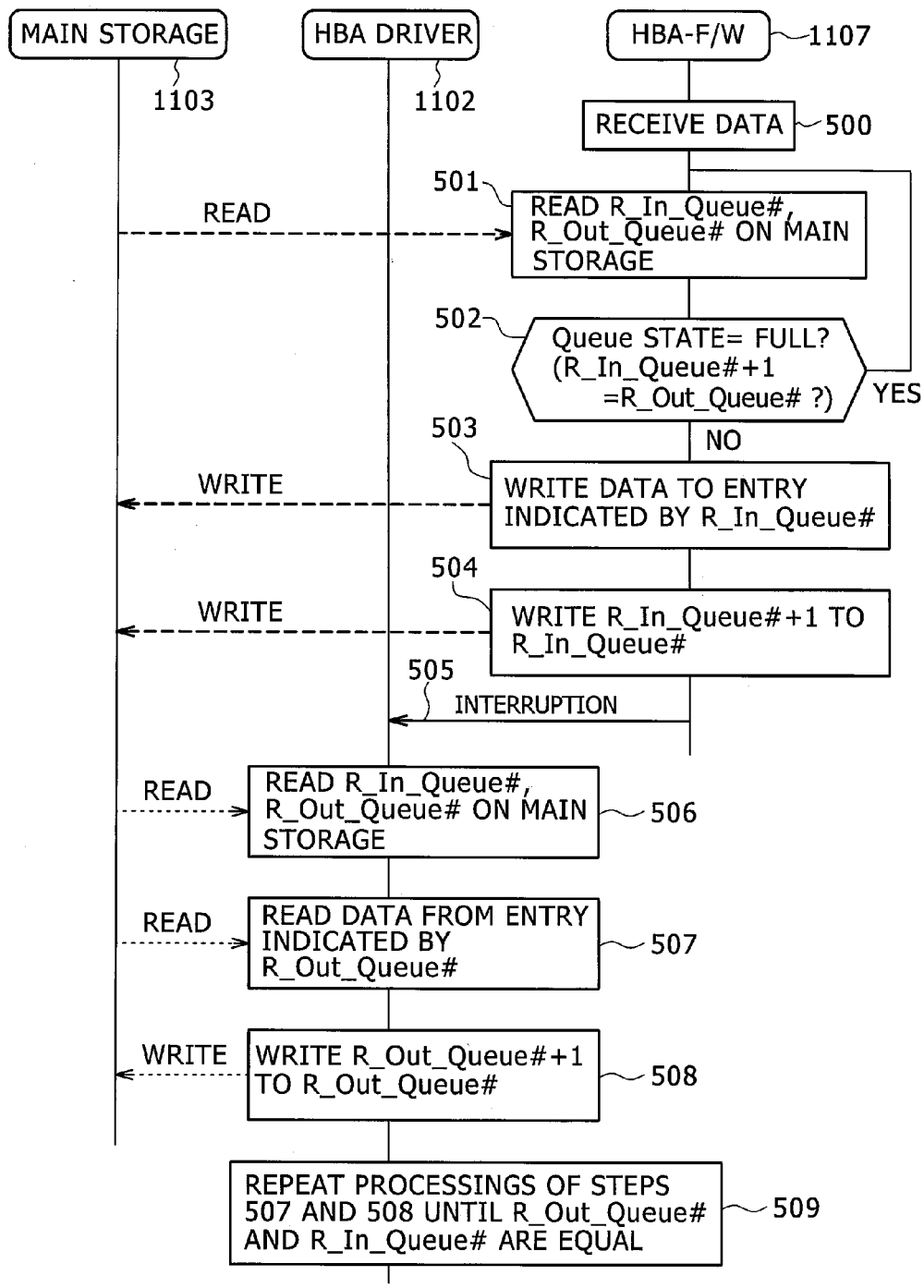
FIG. 7 is a control flow of an I/O response queue in the computer system according to the related art.
Figure 8:
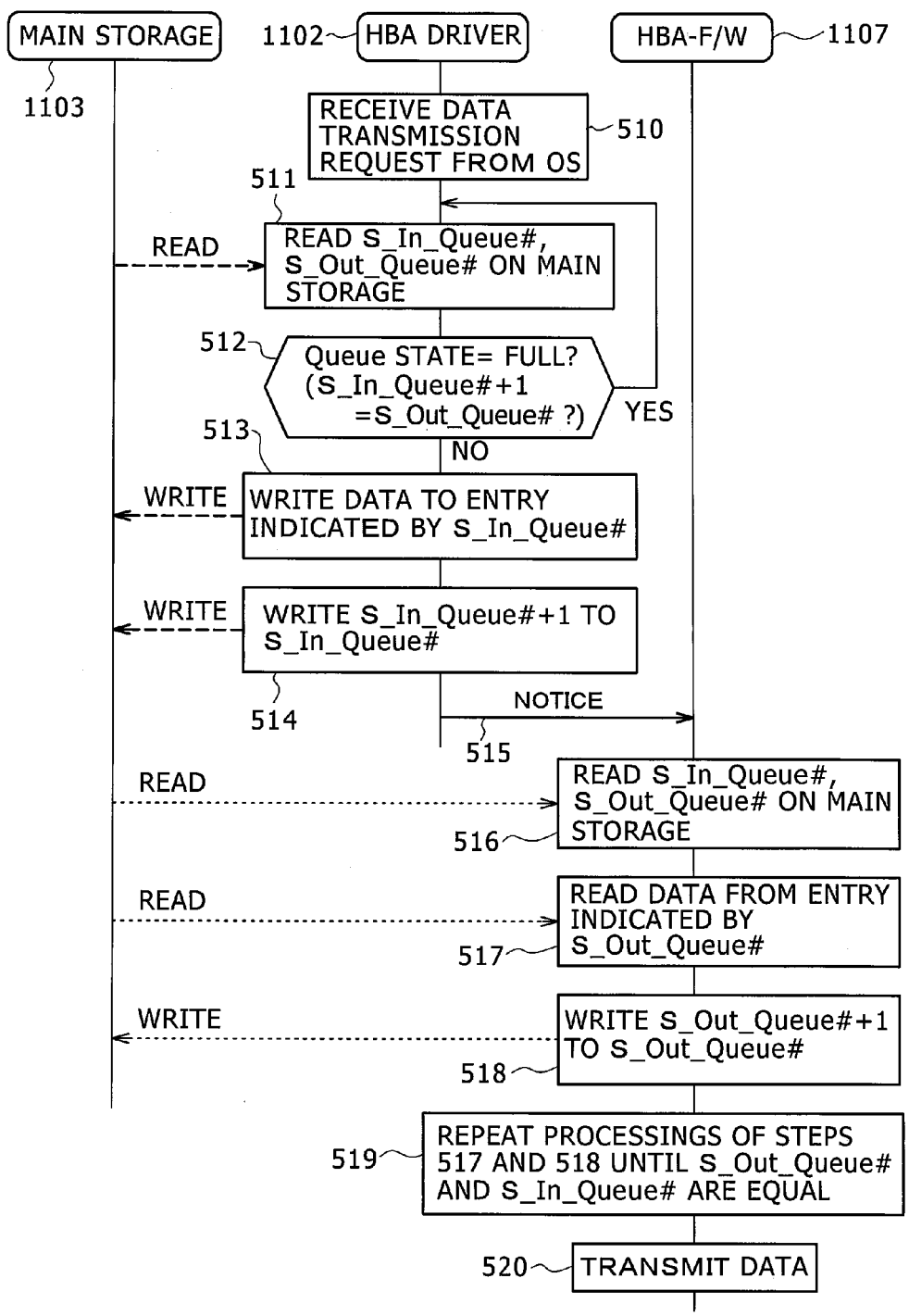
FIG. 8 is a control flow of an I/O activation queue in the computer system according to the related art.

As explained above, according to the present invention, in comparison with the related art system, when a transmission/reception control of data is carried out by using HBA 106, processings which HBA-F/W 107 accesses the main storage 103 through the PCIe bus can be reduced, and a performance of the computer 110 can be improved. An explanation will be given of an effect of improving the performance by using the present invention with reference to the operation flow of FIG. 4 according to the present embodiment, and the operation flow of FIG. 7 of the related art.

A time period which is required for one time of a processing during which HBA-F/W 107, 1107 reads or writes to or from the main storage 103, 1103, by way of the PCIe bus 105, 1105 is defined as Time_A. In this processing, a number of routes by way of which the processings proceed inclusive of the PCIe bus 105, 1105 is large, and TAT (Turn Around Time) is long. Generally, a processing time period of Time_A is about several microseconds.

A time period which is required for one time of a processing during which HBA-F/W 107 reads or writes to or from the storage region 107 at inside of HBA 106, is defined as Time_B. The processing is a processing which is completed at inside of HBA 106, and TAT is short. Generally, a processing time period of Time_B is about several nanoseconds.

A time period which is required for one time of a processing during which the HBA driver 102, 1102 reads or writes to or from the main storage 103, 1103 is defined as Time_C. The processing is a processing which proceeds only by way of the host bridge 112, and TAT is short. Generally, a processing time period Time_C is about several nanoseconds.

In a case of carrying out the control of the I/O response queue by the computer 110 of the embodiment, a time period which is required for carrying out a series of processings for a single received data becomes Time_A (303)×1+Time_B (301 read, 301 write, 304)×3+Time_C×4 (306, 308, 309, 310). On the other hand, in a case of carrying out a control of the I/O response queue by the computer 1110 of the related art, a time period which is required for carrying out a series of processings for a single received data becomes Time_A (501, 503, 504)×3+Time_C (506, 507, 508)×3.

As described above, a value of Time_A is about 1000 times as much as those of Time_B and Time_C. Therefore, the processing related to Time_A becomes a bottleneck since the processing time is long.

According to the computer 110 to which the present invention is applied, "Time_A×2" of a time period which is required for a receiving processing can be reduced in comparison with the computer 1110 of the related art. Further specifically, assuming that Time_A=1000 ns (1 μs), Time_B=1 ns, and Time_C=1 ns, according to the computer 110 of the embodiment, the time period which is required for the receiving processing becomes Time_A×1+Time_B×3+Time_C×4=1000 ns×1+1 ns×3+1 ns×4=1007 ns while the time period required for the receiving processing is Time_A×3+Time_C×3=1000 ns×3+1 ns×3=3003 ns according to the related art system. That is, the processing time period of the embodiment can be reduced to about ⅓ of that of the processing time period of the related art system.

Therefore, according to the computer 110 to which the present invention is applied, a time period which is required for a receiving processing of data that is carried out by HBA can be reduced to about ⅓ of the time period of the related art, and a performance of an input/output control device can be improved.

<Data Transmitting Time>

Figure 5:
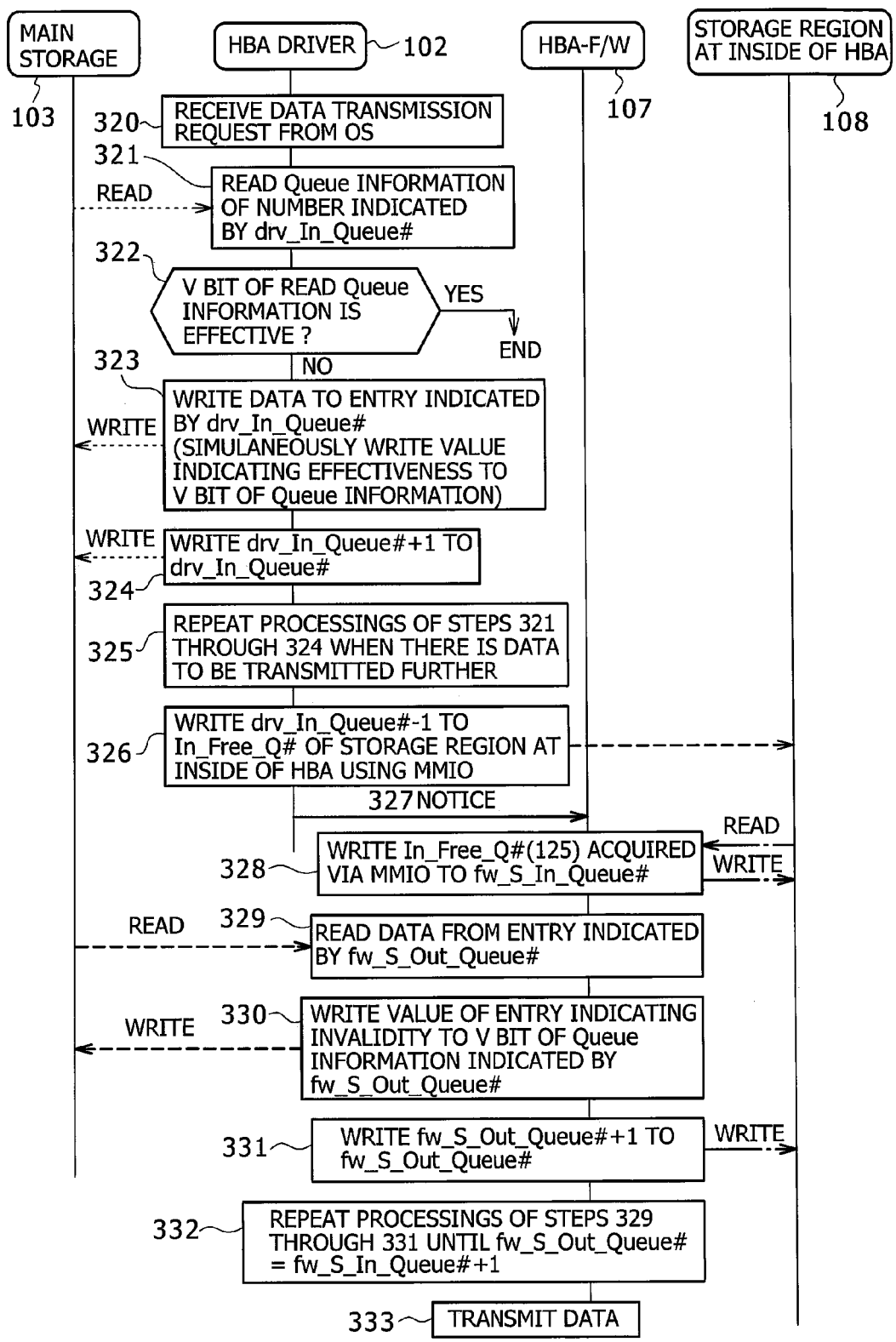
FIG. 5 is a control flow of an I/O activation queue in the computer system according to the present embodiment.
Figure 6:
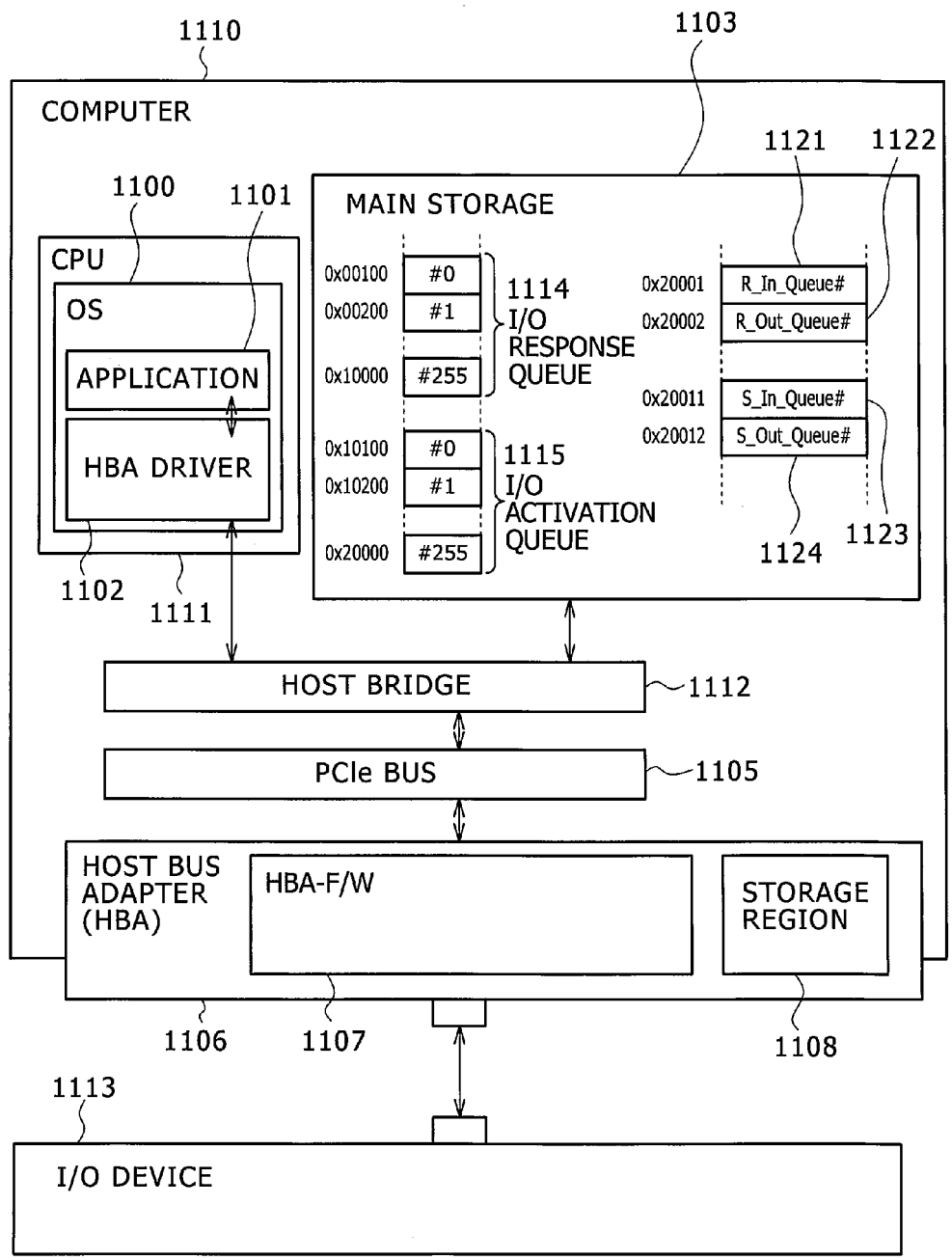
FIG. 6 is a configuration diagram of a computer system of a related art.

FIG. 5 shows an operation flow when a control of the I/O activation queue is carried out in the computer 110. An explanation will be of a case of transmitting data from HBA to the I/O device with reference to FIG. 5.

First, when the HBA driver 102 recognizes that a request for transmitting data is received from OS 100 (320), the HBA driver 102 reads Queue information of an entry of the main storage 103 which is designated by drv_In_Queue#121 (321), and checks a read value of V bit (322).

When the V bit is a value which indicates an effectiveness, the HBA driver 102 proceeds to a standby state. When the V bit is a value which indicates an invalidity, the HBA driver 102 writes data to an entry of the main storage 103 which is indicated by drv_In_Queue#121, and at the same time, writes a value which indicates the effectiveness to the V bit (323).

The HBA driver 102 updates drv_In_Queue#121 to a value indicated by a next entry, and writes the updated value of drv_In_Queue#121 to the main storage 103 (324).

If there is data which is to be transmitted further, processings of 321 through 324 are repeated. However, when a value indicating the effectiveness is detected by checking the V bit at the processing of 322, the repetition is stopped at the time point (325).

Next, the HBA driver 102 writes a value indicating an entry one entry before the entry indicated by drv_In_Queue#121 to In_Free_Queue#122 in MMIO 104 of the main storage 103. Thereby, a value of In_Free_Queue#125 in the storage region 108 at inside of HBA is updated to a queue number which the HBA driver 102 finally enqueues to the I/O activation queue 120 (326). Processings up to 320 through 326 correspond to 200 in FIG. 2.

Thereafter, the HBA driver 102 carries out a processing of noticing that the I/O activation queue 120 is enqueued to HBA-F/W 107 (327). The processing of 327 corresponds to 210 in FIG. 2.

The noticed HBA-F/W 107 acquires a value of a queue number of an entry which the HBA driver 102 finally enqueues from the I/O activation queue 120 by reading In_Free_Queue#125 from the storage region 108 at inside of HBA, and writes the value to fw_S In_Queue#123 which is managed by HBA-F/W 107 (328).

Next, HBA-F/W 107 reads data transmitted from an entry of the I/O activation queue 120 which is indicated by fw_S_Out_Queue#124 (329).

When reading at 329 is completed, HBA-F/W 107 writes a value which indicates the effectiveness to a V bit of Queue information of an entry of the main storage 103 which is indicated by fw_S_Out_Queue#124 (330), updates fw_S_Out_Queue#124 to a value which indicates next entry, and writes the updated value of fw_S_Out_Queue#124 to the storage region 108 at inside of HBA (331).

HBA-F/W 107 repeats processings of 329 through 331 until fw_S_Out_Queue#124 is brought into a state of indicating next entry of fw_S_In_Queue#123 (332). Finally, HBA-F/W 107 transmits data which is read from the main storage 103 to the I/O device 113 (333). Processings up to 328 through 333 correspond to 201 in FIG. 2.

In a case of carrying out the control of the I/O activation queue by the computer 110 of the embodiment, a time period which is required for carrying out a series of processing for a single transmitted data becomes Time_A (329, 330)×2+Time_B (328 read, 328 write, 331)×3+Time_C (321, 323, 324)×3. On the other hand, in a case of carrying out the control of the I/O activation queue by the computer 1110 of the related art, a time period which is required for carrying out a series of processings for a single transmitted data becomes Time_A (516, 517, 518)×3+Time_C (511, 513, 514)×3.

As described above, a value of Time_A is about 1000 times as large as those of Time_B and Time_C. Therefore, the processing related to Time_A becomes a bottleneck since the processing time is long.

According to the computer 110 to which the present invention is applied, in comparison with the computer 1110 of the related art, "Time_A×1" can be reduced from a time period which is required for a transmission processing. Further specifically, assuming that Time_A=1000 ns (1 μs), Time_B=1 ns, and Time_C=1 ns, according to the computer 110 of the embodiment, a time period becomes Time_A×2+Time_B×3+Time_C×3=1000 ns×2+1 ns×3+1 ns×3=2006 ns, whereas according to the related art system, a time period is Time_A×3+Time_C×3=1000 ns×3+1 ns×3=3003 ns. That is, the processing time period of the embodiment can be reduced to about ⅔ of that of the related art system.

Therefore, according to the computer 110 to which the present invention is applied, the time period which is required for the transmitting processing of data which is carried out at HBA can be reduced to about ⅔ of that of the related art, and a performance of an input/output control device can be improved.

What is claimed is:

1. An input/output control method of a computer comprising CPU, a main storage connected to the CPU via a bridge, and a host bus adapter (HBA) connected to the CPU and the main storage via a PCIe bus connected to the bridge for transmitting and receiving a data to and from an I/O device,
wherein the HBA comprises an HBA firmware and a storage region,
wherein the CPU executes an OS and an HBA driver operated on the OS for controlling the HBA,
wherein the main storage comprises an I/O queue from which the data is enqueued or dequeued, a management queue of managing a queue number of the data which is enqueued or dequeued from the I/O queue, an Memory Mapped I/O (MMIO) area in which a storage region of the HBA is mapped,
wherein the HBA driver writes a piece of management information of an updated management queue to the MMIO area when the management queue is updated, and
wherein the OS writes the piece of management information written to the MMIO area to a storage region of the HBA in correspondence with the MMIO area of the main storage.

2. The input/output control method according to claim 1, wherein, when the management queue is updated, the HBA driver writes a queue number one queue number before the updated management queue to the MMIO area as the piece of management information.

3. The input/output control method according to claim 1, wherein the I/O queue is at least either one of an I/O activation queue and an I/O response queue.

4. The input/output control method according to claim 3,
wherein in a case where the computer receives the data from the I/O device, the I/O queue is the I/O response queue,
wherein the HBA firmware enqueues a received data received from the I/O device via the PCIe bus to the I/O response queue, and notices that the received data is enqueued to the HBA driver via the PCIe bus, and
wherein the HBA driver receiving the notice dequeues the received data from the I/O response queue, and transmits the dequeued received data to an application operated on the OS.

5. The input/output control method according to claim 4, wherein when the received data is dequeued from the I/O response queue, the HBA driver updates the management queue to a number next to a queue number of the dequeued received data, and writes a queue number one queue number before the updated management queue to the MMIO area as the piece of management information, and
wherein the OS writes the piece of management information written to the MMIO area to the storage region of the HBA in correspondence with the MMIO area.

6. The input/output control method according to claim 5, wherein the storage region of the HBA comprises:
Out_Free_Q written with the piece of management information by the OS;
fw_R_In_Queue managing the queue number of the I/O response queue which the HBS firmware successively enqueues; and
fw_R_Out_Queue managing a dequeued number from the I/O response queue noticed from the HBA driver to the HBA firmware; and
wherein the HBA firmware refers to the piece of management information written to the Out_Free_Queue, writes the referred piece of management information to the fw_R_Out_Queue, compares the queue number indicated by the fw_R_In_Queue and the queue number indicated by the fw_R_Out_Queue and enqueues the received data to the queue number of the I/O response queue indicated by the fw_R_In_Queue in a case where the queue numbers do not coincide with each other.

7. The input/output control method according to claim 6, wherein the I/O response queue includes an identifier indicating an effectiveness or an invalidity of an entry of the I/O response queue,
wherein in a case where the identifier indicates the effectiveness, the entry indicates that the received data is not dequeued, and
wherein in a case where the identifier indicates the invalidity, the entry indicates that the received data is dequeued.

8. The input/output control method according to claim 3, wherein in a case where the computer transmits the data to the I/O device, the I/O queue is an I/O activation queue,
wherein the HBA driver receives a transmitted data transmitted to the I/O device from an application operated on the OS, enqueues the transmitted data to the I/O activation queue, and notices that the transmitted data is enqueued to the HBA firmware by way of the PCIe bus, and
wherein the HBA firmware receiving the notice dequeues the transmitted data from the I/O activation queue by way of the PCIe bus, and transmits the dequeued transmitted data to the I/O device.

9. The input/output control method according to claim 8, wherein when the transmitted data is enqueued to the I/O activation queue, the HBA driver updates the management queue to a number next to a queue number of the dequeued transmitted data, and writes a queue number one queue number before the updated management queue to the MMIO area as the piece of management information, and
wherein the OS writes the piece of management information written to the MMIO area to the storage region of the HBA in correspondence with the MMIO area.

10. The input/output control method according to claim 9, wherein the storage region of the HBA comprises:
In_Free_Q written with the piece of management information by the OS;
fw_S_In_Queue in which the HBA firmware manages an enqueued number to the I/O activation queue noticed from the HBA driver to the HBA firmware; and
fw_S_Out_Queue managing a queue number successively dequeued from the I/O activation queue, and
wherein the HBA firmware refers to the piece of management information written to the In_Free_Q, writes the referred piece of management information to the fw_S_In_Queue, dequeues the transmitted data from an entry of the I/O activation queue in correspondence with the queue number indicated by the fw_S_Out_Queue, compares the queue number indicated by the fw_S_Out_Queue and the queue number indicated by the fw_S_In_Queue, and repeats a processing of dequeuing the transmitted data from the I/O activation queue until the fw_S_Out_Queue indicates a next queue number of the fw_S_In_Queue.

11. The input/output control method according to claim 10, wherein the I/O activation queue includes an identifier indicating an effectiveness or an invalidity of an entry of the I/O activation queue,
wherein in a case where the entry indicates the effectiveness, the entry indicates that the transmitted data is not dequeued, and
wherein in a case where the entry indicates the invalidity, the entry indicates that the transmitted data is dequeued.

12. A computer comprising:
a host bus adapter (HBA) including an HBA firmware and a storage region and transmitting and receiving a data to and from an I/O device;
a CPU executing an OS and an HBA driver operated on the OS and controlling the HBA;
a main storage including an I/O queue from which the data is enqueued or dequeued, a management queue managing a queue number of the data enqueued or dequeued from the I/O queue, and an Memory Mapped I/O (MMIO) area by which a storage region of the HBA is mapped and connected to the CPU via a bridge; and
a PCIe bus connecting the CPU, the main storage, and the HBA via the bridge,
wherein when the management queue is updated, the HBA drives writes a piece of management information of the updated management queue to the MMIO area, and wherein the OS writes the piece of management information written to the MMIO area to a storage region of the HBA in correspondence with the MMIO area of the main storage.

13. The computer according to claim 12, wherein, when the management queue is updated, the HBA drivers writes a queue number one queue number before the updated management queue to the MMIO area as the piece of management information.

14. The computer according to claim 13,
wherein in a case where the computer receives the data from the I/O device, the I/O queue is an I/O queue response queue,
wherein the HBA firmware enqueues a received data received from the I/O device to the I/O response queue by way of the PCIe bus, and notices that the received data is enqueued to the HBA driver by way of the PCIe bus, and
wherein the HBA driver receiving the notice dequeues the received data from the I/O response queue, and transmits the dequeued received data to an application operated on the OS.

15. The computer according to claim 13,
wherein in a case where the computer transmits the data to the I/O device, the I/O queue is an I/O activation queue,
wherein the HBA driver receives the transmitted data transmitted to the I/O device from an application operated on the OS, enqueues the transmitted data to the I/O activation queues, and notices that the dequeued data is enqueued to the HBA firmware by way of the PCIe bus, and
wherein the HBA firmware receiving the notice dequeues the transmitted data from the I/O activation queue by way of the PCIe bus, and transmits the dequeued transmitted data to the I/O device.

* * * * *